Aug. 5, 1969        J. TSCHUDY, JR        3,458,952
METHOD OF THINNING PLANTS
Original Filed May 4, 1967        7 Sheets-Sheet 1

INVENTOR.
JAY TSCHUDY, JR.
BY
ATTORNEY

Aug. 5, 1969  J. TSCHUDY, JR  3,458,952
METHOD OF THINNING PLANTS
Original Filed May 4, 1967  7 Sheets-Sheet 6

INVENTOR.
JAY TSCHUDY JR.
BY
ATTORNEY.

United States Patent Office 3,458,952
Patented Aug. 5, 1969

3,458,952
METHOD OF THINNING PLANTS
Jay Tschudy, Jr., Shawnee Mission, Kans., assignor to Precision Agricultural Machinery Company, Phoenix, Ariz., a corporation of Arizona
Division of application Ser. No. 636,068, May 4, 1967, now Patent No. 3,402,507. Continuation-in-part of application Ser. No. 518,131, Jan. 3, 1966. This application Apr. 26, 1968, Ser. No. 737,248
Int. Cl. A01b 41/04, 63/24
U.S. Cl. 47—1.43      2 Claims

ABSTRACT OF THE DISCLOSURE

A plant thinning method particularly directed to selectively and automatically thinning and removing certain longitudinally spaced plants along a plant row to give desired growth room between the plants operated by sensing elements contacting the plants in the row.

Cross-references to related applications

This application is a divisional application of Ser. No. 638,068 filed May 4, 1967, and now U.S. Patent No. 3,402,507 which was a continuation-in-part application of application Ser. No. 518,131, filed Jan. 3, 1966, of Jay Tschudy, Jr. for Plant Thinning Apparatus.

Background of the invention

The field of this invention lies in agricultural machinery, and is particularly directed to a method and apparatus for automatically and selectively thinning plants from a plant row by sensing the location of plants growing in the plant row.

One of the possible limitations on the use of precision planting of row crops where the seeds are planted at the precise spacing interval desired in the ultimate crop stand is that most seeds do not have a 100% germination. Where single seeds are planted at the ultimately desired spacing intervals and less than 100% germination is achieved, the row contains a lower crop stand than required to achieve a maximum economic realization from the field. At the present time it is accepted practice to plant seeds at closer spacing than ultimately desired and subsequently thinning the row after the majority of the seeds have sprouted. The present practice either necessitates the use of expensive hand labor or the use of mechanical thinning equipment which cannot discriminate as to which of the surplus plants should be thinned. In any event, compromises are made and the full economic realization of the field is not achieved.

Summary of the invention

The object of this invention is to provide a sensory type plant thinning apparatus which is responsive to the actual presence and spacing of the plants to be controlled.

Another object is to provide a plant thinning device which is applicable to any crop which is thinned to one plant per hill along a plant row.

Another object is to provide a plant thinner particularly adapted to operate upon row crops such as sugar beets, cotton plants and the like.

It is also an object to provide a plant thinning apparatus including a memory unit that gives the implement the ability to not only discriminate between friendly plants and weeds but as in the case of row crop such as beets, it retains a higher number of desirable plants than in former mechanisms of this type.

In instances where the seedlings in the plant row are accurately positioned at a predetermined spacing it is practicable with the instant machine to thin at a later date than heretofore possible under such planting conditions.

It is a further object to provide a plant thinning apparatus which may be used at a later time or extension of the early growing season to give the grower the opportunity to work with the naturally stronger plants.

In certain instances it is an object of this invention to utilize chemical thinning processes.

It is an object to provide a plant thinning device of the sensory type which only under rare circumstances will be fooled by an unfriendly plant or weed.

It is an object of this invention to provide a chemical thinner of the sensory type which can be used in connection with plastic mulched crops along a plant row. The device of the instant invention is preferably to be used with a precision planted row which contemplates planting to a final stand where one plant to the hill is provided while still taking into consideration the realities of nature which will not permit such practice at the present time. The environmental planting system can be safely utilized when twice the desired number of seeds are planted as an insurance factor.

In the instant invention as outlined above it is found sufficiently safe even to permit the use of pelletized seed which will greatly accelerate the acceptance of the apparatus and system where high cash value vegetable crops are to be controlled.

And it is also an object to provide an apparatus to selectively destroy particular plants in a plant row by an electronically controlled sensing array responsive to automatically control the ultimate finish spacing of the plants in the plant row.

Description of the preferred embodiment

In the specific case of growing sugar beets, for example, the seeds are planted at precise spaced intervals of one-half the plant spacing ultimately desired. By way of example, if it is determined that the ideal spacing in a particular field is 10 inches, single seeds would be planted 5 inches apart, such as by the use of apparatus covered in Patents 3,154,031, 3,154,032 and 3,175,523, but this is not essential for the method and apparatus herein contemplated. Any planting method can be used, including hand planting, provided only that the seeds are planted at precise preselected spacing, in this instance substantially 5 inches apart.

After planting, the plant row 10 will be permitted to germinate and after the sprouting of the seeds is complete, a thinning machine will be run along the plant row 10 to cut out or otherwise destroy selected plants 11 which are considered to be surplus. The apparatus, FIGS. 1 and 2, will consist of a machine using three sensing elements 12, 13 and 14 which are mounted on a suitable sled 15 and will run immediately above ground level 16 and sense the germinated plants. The sensor elements will be spaced at precise distances 17 from each other which will correspond to the distance 18 between the planted seeds, in the case of sugar beets thus being substantially 5 inches.

Figures 1, 2:
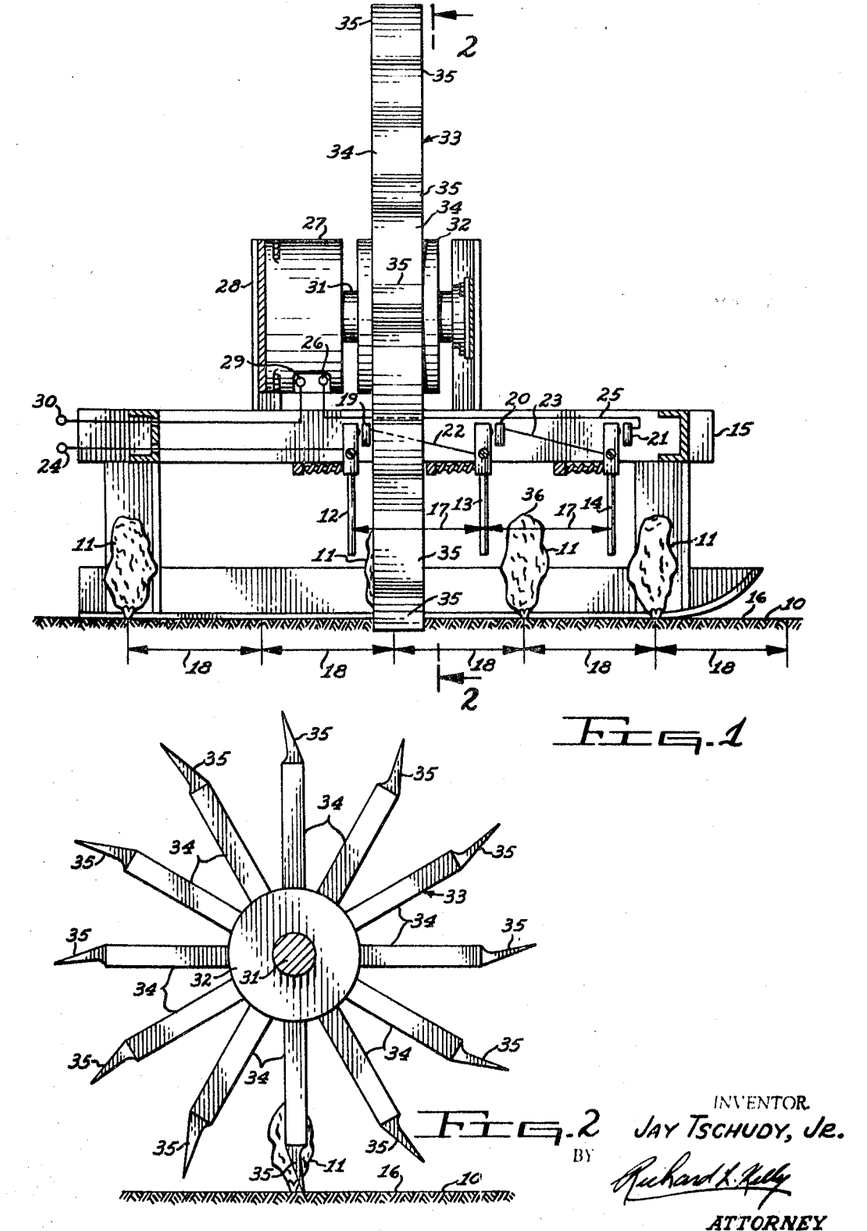
FIG. 1 is a side elevation of a sensory type thinner utilizing a mechanical plant removal element.
FIG. 2 is an enlarged section on the line 2—2 of FIG. 1.

Each of the sensors 12, 13 and 14 are connected to actuate normally open limit switches 19, 20 and 21 which are connected in series by leads 22 and 23, and connected at one end to a suitable power supply lead 24 and at the other end through a lead 25 connected to one power input terminal 26 of a thinning wheel actuator motor 27 suitably mounted by a bracket 28 on the sled 15. The other terminal 29 of the actuator motor 27 is connected to the other power supply lead 30.

Fixed on the output shaft 31 of the actuator motor 27 is the hub 32 of the plant thinning wheel 33 from which radiate a series of spokes 34 terminating in thinning spades 35 adapted to move laterally of the plant row 10 upon intermittent rotation of the thinning wheel 33 by appropriately energizing the actuator motor 27. The machine will take no action until it senses three germinated plants that lie in a row 10 and are substantially 5 inches apart. When this condition prevails, the three sensing elements 12, 13 and 14 acting together, will close the circuit and the middle 36 of the three plants 11 will be destroyed as the wheel 33 which is activated by the circuit that is closed by limit switches 19–20–21 having all three of the sensing elements read the presence of a plant at the same time, is rotated and a thinning spade destroys the plant 36. If desired, the plant destroying means can be a flame.

In the embodiment of the invention illustrated in FIGS. 1 and 2 the plant destroying means is a rotary spade which physically destroys the undesired plants. The plant destroying means employed in the invention may be of any type which will effectively kill the undesired plants and may be chemical, electrical or mechanical in nature. It is also possible to direct a flame against the undesired plant to destroy it. If the plant destroying means employed does not actually remove the plant at the time of destruction, means must be provided in the control circuitry so that the apparatus will treat the undesired plant as if it were destroyed so as not to erroneously sense the plant which will ultimately die, as being a part of the permanent stand in the field.

In its broader aspect, the apparatus can be used to thin any desired plant of a series which have sprouted at pre-set distances from each other. For example, in the case of lettuce, two sensing elements can be used to eliminate one undesired sprouted plant. In other instances, if it were decided that three plants in a row could be tolerated but not four, four sensing elements could be used to destroy the undesired fourth plant. In most, but not all instances, the equipment used will contain one more sensing elements than the number of plants that can be tolerated at the spacing interval at which the seeds are planted in the plant row. Where an extra sensing element is not used, a signal accumulator or equivalent element must be utilized.

Figure 3:
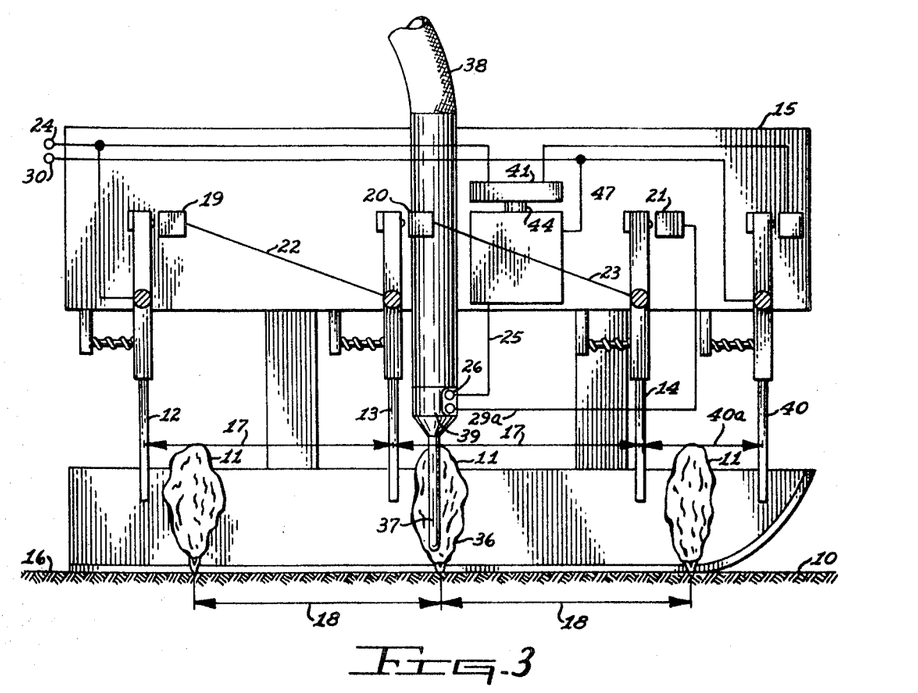
FIG. 3 is a diagrammatic side elevation of a sensory type plant thinning apparatus utilizing a chemical thinning process adapted to the fact that the plant does not die immediately when sprayed chemically.
Figure 4:
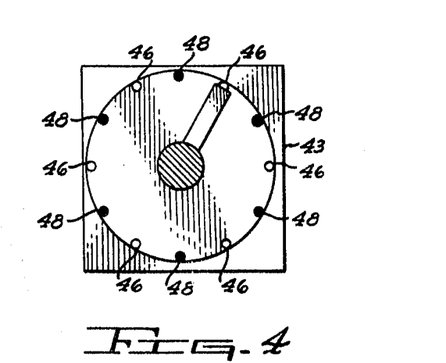
FIG. 4 is an enlarged view of an especially constructed circuit interrupter for the apparatus of FIG. 3.

An arrangement of the chemical thinner of FIGS. 3 and 4 is utilized in view of the fact that the plant 36 does not die immediately when sprayed and remains in the field to be sensed and to actuate the subsequent spraying of additional adjacent plants. To overcome this problem a fourth sensing element 40 is provided which is not tied in directly with the three sensing elements 12–13–14 which actuate the spray nozzle 37, but merely trips an actuator 41 each time it contacts a plant 11 in the plant row 10. A supply line 38 provides plant destroying material for the spray nozzle 37.

Figure 6:
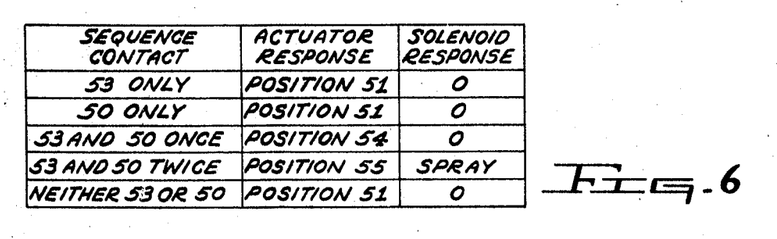
FIG. 6 is an operation diagram of the apparatus shown in FIG. 5.

The sensor 40 of the actuator 41 causes the actuator to intermittently actuate the circuit interrupter 43 which is connected to the shaft 44 so as to each time move the contact arm 45, FIG. 6, either to a connected position 46 of leads 25 and 29a with power lead 30 through lead 47 or to disconnected position 48 of these leads 25 and 47, to thus energize or deenergize the series circuit through the limit switches 19–20–21 to activate or de-activate the functions of the sensors 12–13–14, so that the sensing element 40 of the actuator can over-ride the three sensing elements for the spray nozzle 37. By this arrangement, before a plant will be sprayed the three sensing elements 12–13–14 must be closed and the actuator 41 must have moved the circuit interrupter to a connected position 46 before solenoid valve 39 is opened and any plant will be sprayed. The distance 40a between sensor 40 and the sensor 14 must be less than the distance 17 between the sensors 12–13 and 13–14. Ordinarily the distance or spacing 40a is one-half the distance 17. This modification will assure that only the plants to be thinned are actually sprayed.

Figure 5:
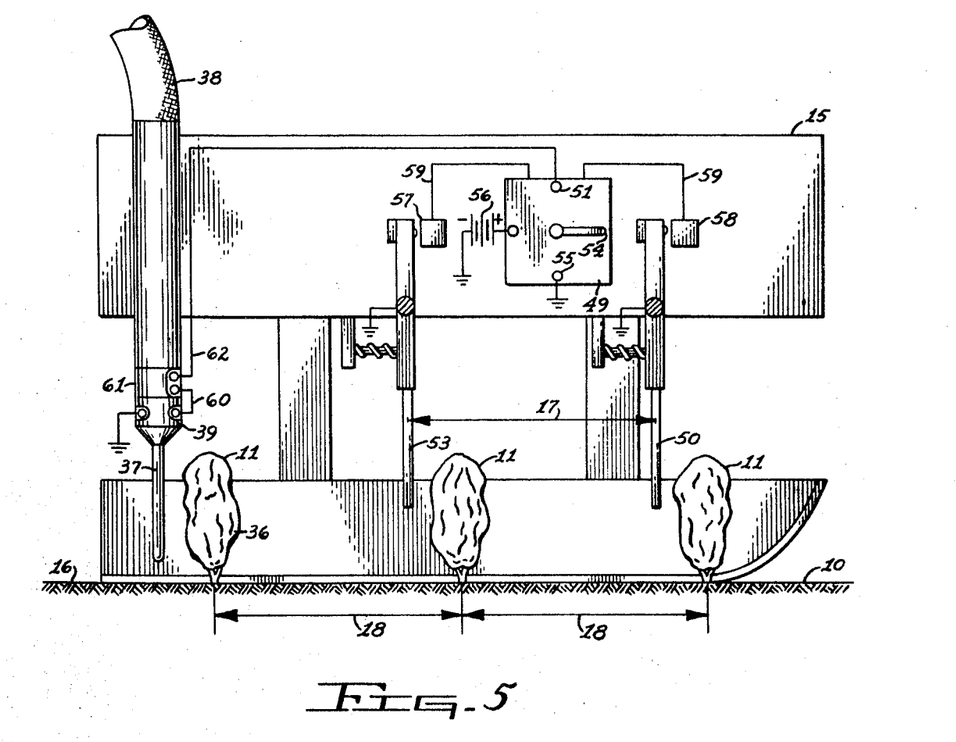
FIG. 5 is a diagrammatic side elevation of still another modification of the control mechanism for the apparatus of FIG. 3.

Still another embodiment of this invention, FIGS. 5 and 6 is to thin, for example, sugar beets 11 by spraying a selected plant 11 when three plants in a row sprout on substantially 5 inch centers 18. The device is similar to the four sensing element device shown in FIGS. 3 and 4 but two of the sensing elements have been eliminated as their function is replaced by a memory unit actuator 49.

This arrangement operates as follows: As the sled 15 moves down the crop row 10 and sensing element 50 reads a plant 11, the memory unit actuator 49 remains in position 51 and does not open the solenoid valve 39. The same situation prevails if sensing element 53 reads a plant. If sensing elements 53 and 50 both read a plant, the memory unit actuator 49 is moved to position 54, but the solenoid 39 is not actuated. The next action of memory unit actuator 49 depends upon the next signals received from sending elements 50 and/or 53. If the next contact with plants involves both units 53 and 50, the memory unit actuator 49 moves to position 55, the solenoid 39 is energized to open position and the third plant 36 is sprayed. After the solenoid 39 has been energized and the third plant 36 has been sprayed, the memory unit actuator 49 returns to position 51. Alternatively, if after the memory unit actuator 49 is moved to position 54, the next contact with the plants involves only sensing element 53 or 50, the memory unit actuator 49 is returned to position 51.

A source of power such as a battery 56 is connected to the memory actuator 49 unit so that the normally open limit switches 57 and 58 of sensors 50 and 53, connected thereto by leads 59, may control the functions of the actuator 49 as described. The solenoid valve 39 for the nozzle 37 is connected by suitable leads 60 through a suitable time delay relay 61 through leads 62 to the actuator 49, the delay relay serving to control the exact travel position of nozzle 37 to plant 36 and moment of spray from the nozzle 37 during the forward movement of the sled 15 along the plant row 10 so as to be sure the sprayed material is properly centered on and fully covers the plant to be eliminated. The apparatus of this invention can be adapted to readily give the grower a total count of the seeds that have germinated in a field, the number of the germinated plants that have been thinned and from these two figures the plant population of the field. This information can be of substantial value to the grower in evaluating the effectiveness of new planting practices, e.g., the efficiency of experimental fungicides, nematocides and the like, and in accurately predicting the yield of any given field. To obtain such information, a first counting device can be activated by one of the sensing elements when it senses the presence of a plant and a second counting device can be activated by the signal fed to activate the plant destroying mechanism.

The apparatus of the invention can be built to destroy any desired plants of those sensed. As illustrated in FIGS. 1 and 3 the middle of the 3 sensed plants is destroyed. The embodiment illustrated in FIG. 5 destroys the last (in the direction of travel of the sled) of the three sensed plants. The embodiment illustrated in FIGS. 8, 9 and 10 destroy the first (in the direction of travel of the sled) of the three sensed plants.

Figure 7:
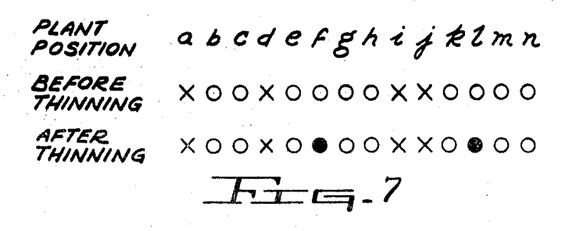
FIG. 7 illustrates the action of the thinning apparatus of FIGS. 1, 3 and 5.

FIG. 7 illustrates the action of the apparatus of either of FIGS. 1, 3 and 5 in thinning a typical crop such as sugar beets which are planted on 5 inch centers and it is desired to thin the crop so that no 3 adjacent plants are permitted to grow on 5 inch centers. As illustrated with the first 14 seeds planted in a row, 4 seeds have failed to germinate as designated by an X at plant positions a, d, i and j. The germinated plants are illustrated as open circles. If the row were not thinned, the plants at plant positions e, f, g and h and also at k, l, m and n would be stunted because of overcrowding. After the field is thinned, the plants at f and l have been removed and more favorable growing conditions will be obtained for plants e, g, h, k, m and n.

In the arrangement shown in FIGS. 8 through 13 inclusive, there is provided a plant thinning machine having a frame 60 mounted on a suitable sled 61 which is pulled along the ground level 16. Two sensing devices 62 and 63 are mounted on the frame 60 behind the thinning mechanism indicated generally at 64 which may take the form of a swinging double edge hoe element 65 having the oppositely disposed thinning blades 66 mounted to swing on suitable pivot pins 67 carried on the frame 60 about longitudinally disposed horizontal axes 68 relative to the plant rows 10. Pivotally connected by pins 70 to the outer ends of the integral actuating lever 69 of the swinging hoe elements 65 are the piston rods 71 of suitable fluid pressure cylinders 72 carried on the frame 60. A suitable source of fluid pressure is transmitted from the pressure supply line 73 connected to the electrically operated reversing valves 74 operable to control the cylinders 72 and the laterally swinging plant chopping and thinning blades 66.

Figure 8:
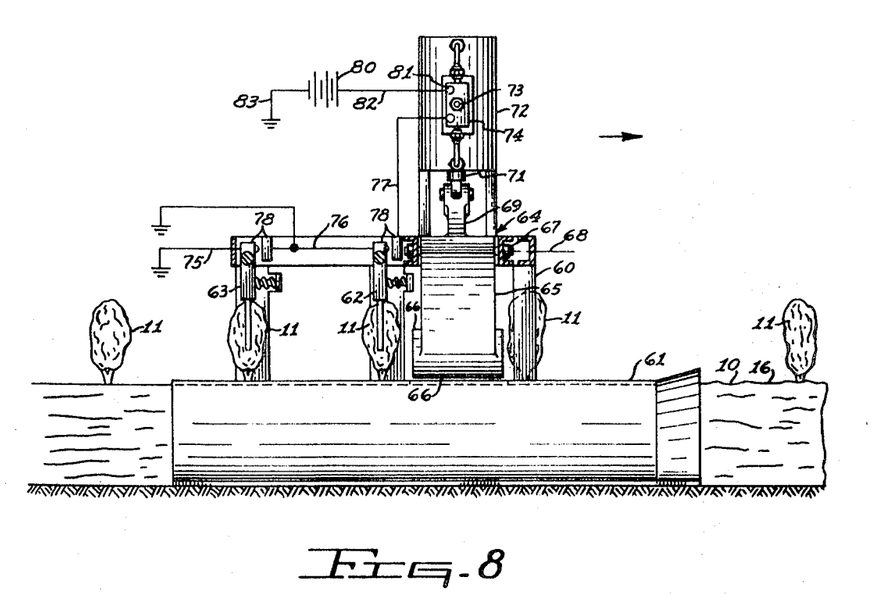
FIG. 8 is a side elevation of another form of a sensory type thinner utilizing a mechanical plant chopper element.

The normally open contacts 78 of sensing elements 62 and 63, FIG. 8, are connected in series by leads 75, 76 and 77 with one terminal 79 of a control valve 74 and ground, while a source of electrical energy 80 is connected between the other terminal 81 and ground by the leads 82 and 83.

Figures 10, 11:
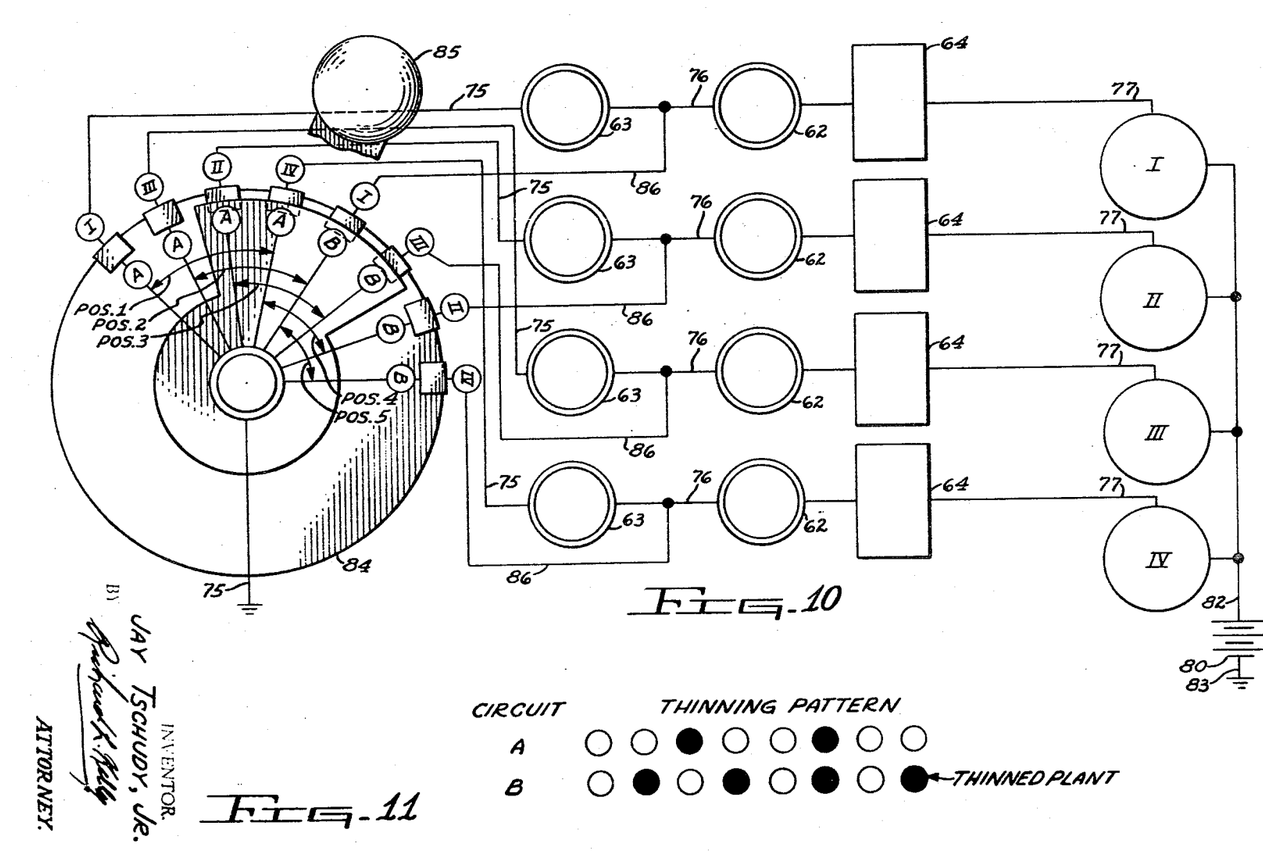
FIG. 10 is an enlarged circuit diagram for a thinner apparatus essentially similar to that illustrated in FIGS. 8 and 9, but containing four mechanical chopper elements.
FIG. 11 is a thinning pattern diagram.

In the circuitry shown in FIG. 10, four rows of plants are to be treated simultaneously. The apparatus is wired with a selector switch 84 having the operating handle 85. Two circuits A and B are available. With the A circuit selected, both sensing elements 62 and 63 are part of the circuit 75, selector switch 84, 75, 76 and 77. Under these conditions sensing elements 62 and 63 must necessarily contact two consecutive plants 11 before the thinning mechanism 64 can be actuated to chop out a plant. Therefore, if only a single plant 11 is sensed, nothing will happen. When two plants are sensed, with a skip at the next planted position (in the direction of sled travel) the thinning blade 66 is actuated, but no plant is removed. If three consecutive plants 11 are encountered, the leading or forward plant is removed. The A circuitry establishes the pattern shown in FIG. 11, A.

Figure 14:
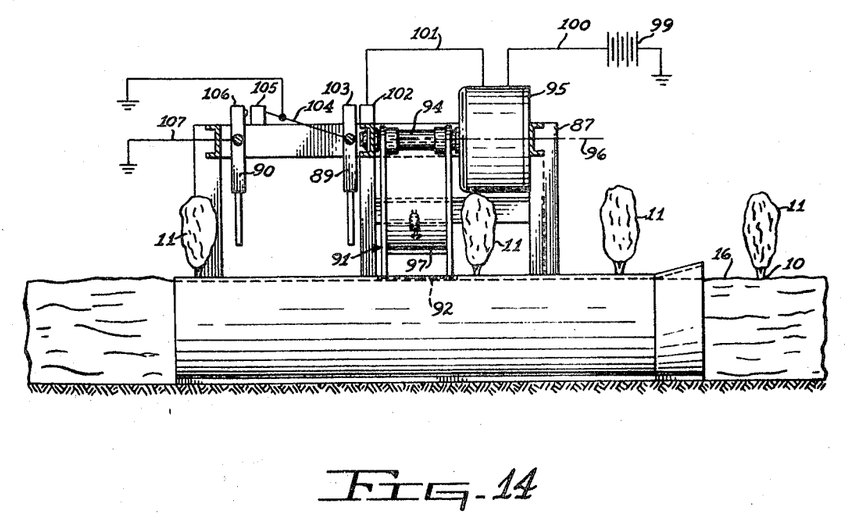
FIG. 14 is a side elevation of a sensory type thinner utilizing a rotary solenoid actuated plant chopper element.
Figure 15:
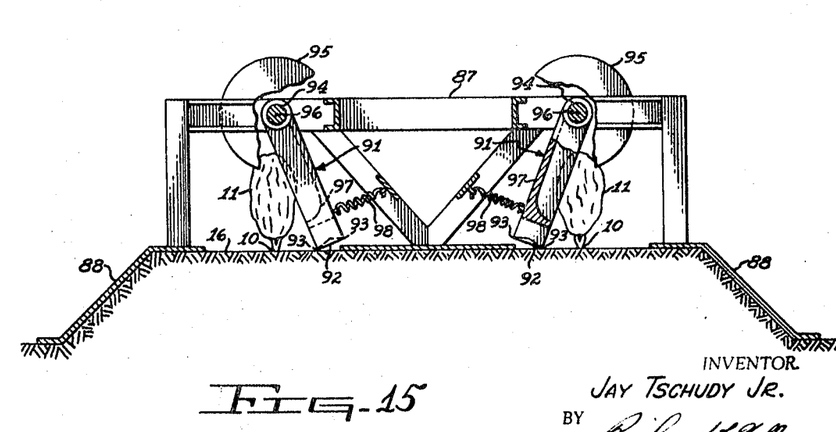
FIG. 15 is a front elevation of the apparatus shown in FIG. 14.

In the arrangement shown in FIGS. 14 and 15, there is provided a plant thinning machine having a frame 87 mounted on a suitable sled 88 which is pulled along the ground level 16. Two sensing devices 89 and 90 are mounted on the frame 87 behind the thinning mechanism indicated generally at 91 which may take the form of a swinging double edge hoe element 92 having the oppositely disposed thinning blades 93 mounted to swing on rock shaft 94 of a rotary solenoid 95 carried on the frame 87 for swinging about longitudinally disposed horizontal axes 96 relative to the plant rows 10. The arm 97 of the hoe element 92 is interconnected by a tension spring 98 which normally yieldingly holds the hoe element to one side of the plant row 10. Whenever the solenoid 95 is energized, the hoe element swings to the other side of the row, the spring 98 returning the hoe element to the opposite side when the solenoid is deenergized.

Figure 9:
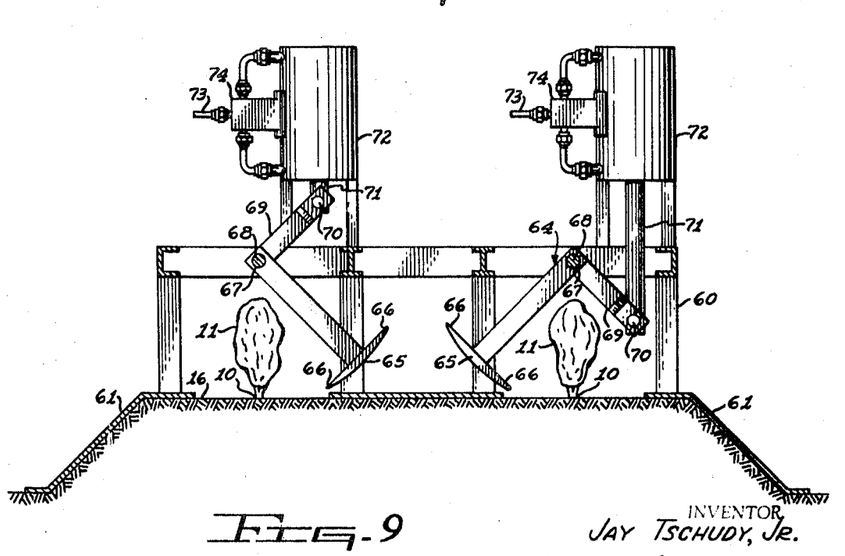
FIG. 9 is a front elevation of the apparatus shown in FIG. 8.

A suitable source of electrical energy 99 has one lead 100 connected to the solenoid 95 and its other lead connected to ground. The other lead 101 is connected to the fixed contact 102 of sensing device 89. The movable contact 103 of the sensing device 89 is connected by lead 104 to ground while the fixed contact 105 is also connected to ground lead 104. The movable contact 106 is connected by a lead 107 to ground, contacts 102-103 and 105-106 being normally open. A control circuit such as shown in FIG. 10 may be utilized to actuate and deenergize the rotary solenoids 95 in the manner that the control valves 74 of FIGS. 8 and 9 are operated.

When the handle 85 of selector switch 84 is adjusted for B circuitry, the rear sensing element 63 is bypassed in the circuit 75, selector switch 84, 86 so that it is necessary to encounter one plant 11 in order to actuate the hoe 65. B circuitry establishes the pattern shown in FIG. 11, B.

In summary, when four rows of thinners are utilized as shown in FIG. 10, it will be possible to establish five different thinning patterns on any given emergence pattern, or more important, five different ranges of end plant population. It will be possible for the grower to select such setting as will best match the production potential of a particular soil, stronger soils being able to support a denser stand than can be maintained by weak soils.

Figures 12, 13:
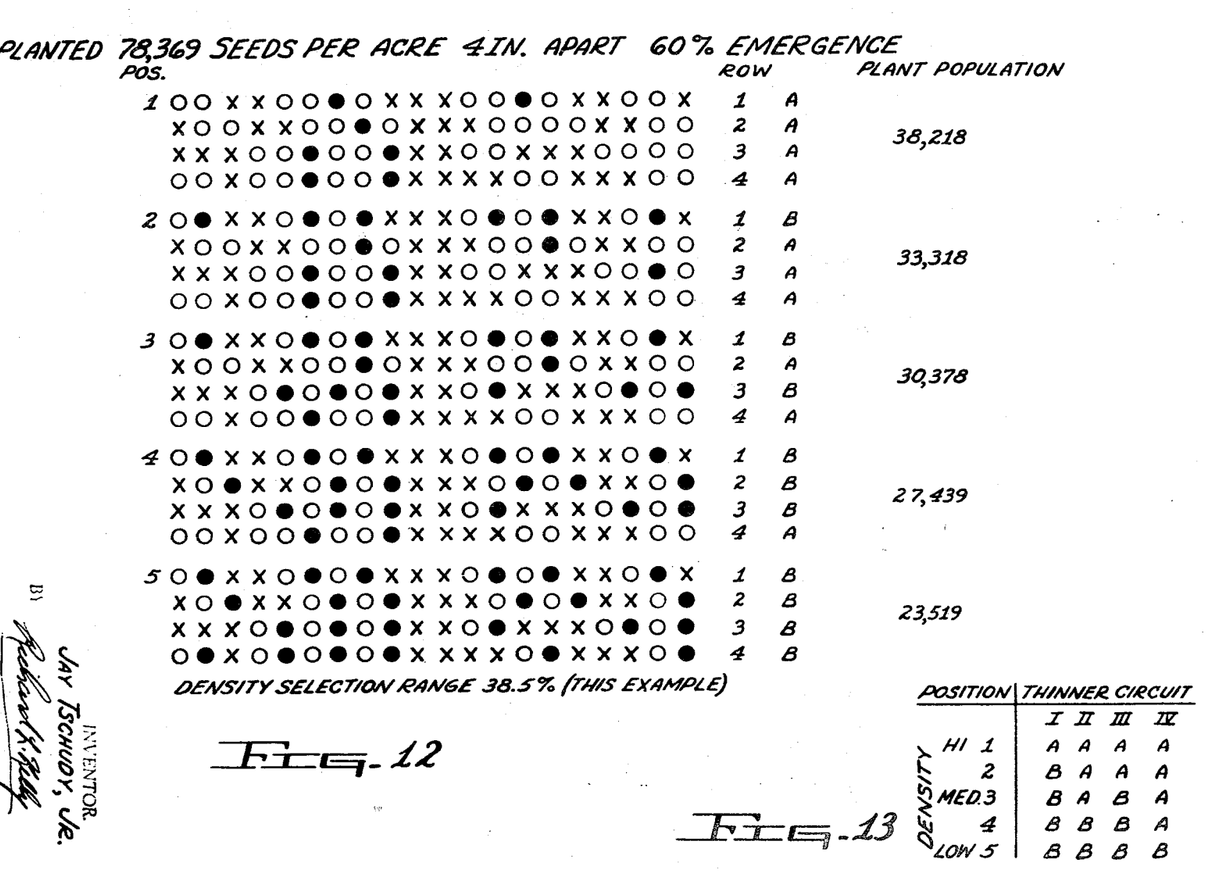
FIG. 12 is a density selection range diagram.
FIG. 13 is a density position thinner circuit diagram.

FIG. 12 shows the plant populations that can be obtained using the apparatus illustrated in FIG. 11. In the experiment illustrated 78,369 seeds per acre are planted on centers 4″ apart in rows spaced 40″ apart. With 60% germination the field population would be as shown in which the circles represent a germinated plant and the X's represent skips. The plants which are selectively destroyed are represented by the filled in or black circles. When all of the thinners are operated on the capital A circuitry, the plant population is reduced to 38,218 plants per acre. When all of the thinners are operated on the capital B circuitry, the plant population is reduced to 23,519 plants per acre. The plant population with the above are shown in FIG. 12. FIG. 13 illustrates the combination of circuitry used to obtain the plant population shown in FIG. 12.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

I claim:

1. A method for growing plants in plant rows in which a majority of the plants are spaced on a basic center distance apart, all of the plants are on a center distance spaced at least one-half said basic center distance from the nearest plant, and no three contiguous plants are spaced on a center distance one-half said basic center distance apart, which method comprises:
- (A) planting single plant seeds one-half said basic center distance apart in a plant row,
- (B) waiting for a period of time sufficient for substantially all of the seeds planted in step A to germinate,
- (C) moving along a plant row while sensing at spaced points one-half said basic center distance apart along a plant row to simultaneously sense the presence of germinated plants in the plant row and transmitting first signals in response thereto,
- (D) utilizing said first signals to generate a second signal only when said first signals are received by the simultaneous sensing of said plants from a plurality of said spaced sensing points,
- (E) and finally utilizing said second signal from step D to effect a destruction of intermediate plants sensed at said sensing points.

2. A method for growing sugar beets in plant rows in which a majority of the plants are spaced on centers 10 inches apart, all of the plants are on centers spaced at least 5 inches from the nearest plant, and no three contiguous plants are spaced on centers substantially five inches apart, which method comprises:

- (A) planting single sugar beet seeds substantially five inches apart in a plant row,
- (B) waiting for a period of time sufficient for substantially all of the seeds planted in step A to germinate,
- (C) moving along a plant row while sensing at three spaced points five inches apart the presence of germinated plants in the plant row and transmitting first signals in response thereto,
- (D) utilizing the individual first signals from the plant-sensing points so as to generate a second signal only when the first signals are received simultaneously from all three spaced sensing points,
- (E) and finally utilizing said second signals from step D to effect a destruction of intermediate plants sensed at said sensing points.

References Cited
UNITED STATES PATENTS

| | | | |
|---|---|---|---|
| 1,303,789 | 5/1919 | Janes | 172—6 XR |
| 2,682,132 | 6/1954 | Marihart | 47—1 |
| 3,181,618 | 5/1965 | Miller | 172—6 |

ROBERT E. BAGWILL, Primary Examiner

U.S. Cl. X.R.

172—6; 239—146